US006876711B2

(12) United States Patent
Wallace et al.

(10) Patent No.: US 6,876,711 B2
(45) Date of Patent: Apr. 5, 2005

(54) NEUTRON DETECTOR UTILIZING SOL-GEL ABSORBER AND ACTIVATION DISK

(76) Inventors: Steven A. Wallace, 1256 Lovell View Dr., Knoxville, TN (US) 37932; Andrew C. Stephan, 441 Hillvale Turn East, Knoxville, TN (US) 37919

( * ) Notice: Subject to any disclaimer, the term of this patent is extended or adjusted under 35 U.S.C. 154(b) by 0 days.

(21) Appl. No.: 09/962,769

(22) Filed: Sep. 24, 2001

(65) Prior Publication Data

US 2002/0067789 A1 Jun. 6, 2002

Related U.S. Application Data

(60) Provisional application No. 60/234,872, filed on Sep. 22, 2000.

(51) Int. Cl.[7] ................................................. G01T 1/06
(52) U.S. Cl. .................. 376/154; 250/390.01; 376/153
(58) Field of Search ................................ 376/154, 155, 376/153; 250/390.01, 370.05

(56) References Cited

U.S. PATENT DOCUMENTS

| | | | | |
|---|---|---|---|---|
| 3,818,226 A | * | 6/1974 | Strindehag | 376/159 |
| 4,271,361 A | * | 6/1981 | Jacobs | 250/390.01 |
| 4,475,948 A | * | 10/1984 | Cawley et al. | 376/146 |
| 4,597,936 A | * | 7/1986 | Kaae | 376/172 |
| 4,617,167 A | * | 10/1986 | Kruse et al. | 250/374 |
| 5,026,988 A | * | 6/1991 | Mendenhall et al. | 250/287 |
| 5,242,631 A | * | 9/1993 | Iyer et al. | 264/5 |
| 5,334,840 A | | 8/1994 | Newacheck et al. | 250/483.1 |
| 5,446,286 A | * | 8/1995 | Bhargava | 250/361 R |
| 5,656,815 A | * | 8/1997 | Justus et al. | 250/337 |
| 5,939,722 A | * | 8/1999 | Werner et al. | 250/338.4 |
| 5,973,328 A | | 10/1999 | Hiller et al. | 250/390.01 |

FOREIGN PATENT DOCUMENTS

GB          0 686 178 B1 *  6/1997

* cited by examiner

Primary Examiner—Michael J. Carone
Assistant Examiner—R Palabrica
(74) Attorney, Agent, or Firm—Deborah A. Peacock; Vidal A. Oaxaca; Peacock Myers & Adams, P.C.

(57) ABSTRACT

A neutron detector utilizing a sol-gel absorber incorporating a fissionable material and an activation disk. Preferably utilizing Li-6 and B-10 as fissionable material and Ag-109 as activation disk material for increased sensitivity and better differentiation of thermal versus prompt neutrons and neutrons versus other radiation fragments.

18 Claims, 3 Drawing Sheets

NEUTRON DETECTOR UTILIZING SOL-GEL ABSORBER AND ACTIVATION DISK

This application claims the benefit of provisional 60/234,872 filed on Sep. 22, 2000.

BACKGROUND OF THE INVENTION

1. Field of the Invention (Technical Field)

The present invention relates to neutron detectors, more particularly neutron detectors with solid absorbers.

2. Background Art

Neutron detectors are useful in a number of industries, including the oil industry for detecting potential oil yielding sites, the medical field, and surveillance in nuclear facilities and weapons storage. Neutrons are uncharged particles generally contained within the nucleus of an atom, which do not ionize matter as they pass through it. Therefore, unlike their proton and electron counterparts, they are difficult to detect directly. Indirect evidence of a neutron event must be used for detection, instead of detection of the neutron itself.

Neutron detection is an unequivocal signature for the active/passive determination of the presence of transuranic elements associated with nuclear power generated plutonium and declared enriched uranium and plutonium derived from the disassembly of nuclear weapons. Many commercialized neutron detection systems are available in the industry. For example, a neutron detector, as disclosed in U.S. Pat. No. 5,334,840 to Newacheck et al., detects photons of light emitted by carbon infiltrated boron nitride in its hexagonal form when bombarded by neutrons. The amount of light detected correlates to the number of neutrons bombarding the boron nitride.

Another commercially available neutron detector utilizes Helium-3 as the neutron absorber. Helium-3 decomposes into H and $H_3$ when bombarded by neutrons and simultaneously emits electrons with an energy of 764 keV. The ionization of the electrons can be detected using conventional methods well known in the art. This type of neutron detector requires a long collection time for the resulting ionization, requiring integrating and differentiating time constants of between 1 and 5 microseconds for the best results.

Neutron detection for monitoring the dose of thermal neutrons given patients receiving boron neutron-capture therapy utilizes Lithium-6 and a cerium activator in a glass fiber. U.S. Pat. No. 5,973,328 ('328 Patent), which is hereby incorporated by reference, went beyond this prior art technique by allowing a cerium activated glass fiber to be coated with fissionable elements. The '328 Patent first incorporated sol-gel techniques into neutron detection.

The sol-gel area of chemistry, first discovered in the 1800s, received renewed interest when the process was found useful in producing monolithic inorganic gels at low temperatures which could then be converted to glasses without a high temperature melting process. Sol-gel techniques are especially helpful in producing neutron detectors since fissionable materials may be incorporated that would not otherwise survive the high melting temperatures of making glass components.

As discussed above, neutrons are not detected directly. Therefore, emissions detectors such as microchannel plates, channeltrons, or avalanche photodiodes are common in the industry for detection of ultraviolet light and fissioned particles such as electrons. Microchannel plates and channeltrons both operate on the same basic principle of amplifying proportional signals emitted from fissionable materials. A microchannel plate is usually formed lead glass with a uniform porous structure of microchannels. Each functions as a channel electron multiplier, independent of its adjacent counterpart. A thin metal electrode is vacuum deposited on both the input and output surfaces to electrically connect the channels in parallel.

Channeltrons are horn-shaped continuous dynodes, coated on the inside with an electron emissive material. When an ion strikes the channeltron, it creates secondary electrons that have an "avalanche effect," creating more secondary electrons and ultimately a current pulse.

The '328 Patent discloses sol-gel techniques to provide a device that has a glass film containing a fissionable material such as lithium oxide, uranium oxide, thorium oxide, plutonium oxide, or neptunium oxide which, when bombarded with neutrons, emits a prompt electron, proton, triton, or fission fragment which is detectable by standard UV and particle detectors as discussed above, e.g. microchannel plates or channeltrons. This doped glass film containing a fissionable material can be used in conjunction with a detector component for a useful detection device. The '328 patent also discloses use of a rare earth element, i.e. cerium oxide, that fluoresces when ionized to enhance the UV light emission.

Conventional neutron detection devices typically incorporate exotic materials and are expensive and difficult to maintain, given the sensitivity of the equipment. The '328 Patent device, while certainly a great step forward in ease, accuracy, and affordability of detection, lacks a desired level of sensitivity with respect to distinguishing between neutrons and other radiation fragments such as gamma rays.

The present invention incorporates the effectiveness of the sol-gel chemistry doping techniques found in the '328 Patent combined with emission detectors that have an added distinguishing capability with regard to types of radiation emitted, thereby overcoming some of the disadvantages of the prior art described herein.

SUMMARY OF THE INVENTION (DISCLOSURE OF THE INVENTION)

The present invention encompasses neutron detectors utilizing sol-gel chemistry for placement of fissionable materials in conjunction with a detector for detecting neutron flux. Additionally, the invention is directed to use of an activation disk to increase sensitivity, efficiency, and accuracy of neutron detection.

The present invention provides a neutron detector comprising a material that yields a prompt electron, proton, triton, or fission fragment when the material absorbs a neutron. The material is incorporated in a sol-gel glass medium. A detection member is included for detecting electrons, protons, tritons, or fission fragments of the material. Additionally, an activation disk (e.g. silver or Ag-109) is incorporated into the apparatus.

In one embodiment of the neutron detector, the material is deposited on an essentially rigid element, or where the material is fissionable. The essentially rigid element is made of, e.g. a quartz plate, a metal plate, a glass lens, a glass container, a silicon wafer, or a glass fiber. The preferred materials are Li-6, B-10, U-234, U-235, U-236, U-238, Pu-238, Pu-239, Pu-240, Th-232, and Gd. The material may be a metallic ion. If it is a metallic ion, it may be contained within a metallic compound, such as the fissile metals lithium, boron, uranium, thorium, plutonium, and neptunium.

The neutron detector preferably further has a detection member such as a microchannel plate, a channeltron, an avalanche photodiode, a scintillator, or a silicon surface barrier detector.

In one embodiment of the neutron detector, a rare earth element, e.g. cerium and europium, is included within the glass medium. In an alternative embodiment, the essentially rigid element comprises a glass fiber containing a rare earth element. A phosphor or crystal may be included within the glass medium.

The detection member may be in a pair wherein the material in the sol-gel glass medium is interposed between the pair of detection members. Or, the detection members may be a single member. Likewise, more than two detection members may be utilized.

The invention may comprise a phosphor plate electrically connected to the detection member. A camera is disposed below the phosphor plate for recording the neutron striking the material in the sol-gel glass medium.

When a plurality of neutron detectors are utilized, preferably each of the plurality of neutron detectors has a material different from each of the other neutron detectors.

The present invention may have a pulsed neutron source, emitting neutrons through a test article toward the neutron detectors. Activation disks are interposed between the surface of the detector with the sol-gel glass medium and a radiation source. The pulsed neutron source emits neutron pulses of a nominal few microsecond duration.

The invention may further comprise an x-ray machine emitting x-rays directed at a test article and capable of generating photoneutrons in the test article for detection by at least one of the neutron detectors.

A primary object of the present invention is to provide a simple inexpensive neutron detector that is obtained from conversion of a silicon surface barrier detector.

A further object of the present invention is to provide a scintillation detector with increased sensitivity.

Another object is to provide an improvement over the prior art sol-gel dopants with dopants of increased sensitivity and easily interpretable spectra clearly differentiating between thermal and prompt neutrons.

Yet another object of the present invention is to provide an activation disk which increases the sensitivity of the neutron detector and differentiates from other radiation fragments.

A primary advantage of the present invention is the simple, inexpensive conversion of a pre-existing air testing device into a neutron detector.

Another advantage is the increased sensitivity and readability of the device.

Still another advantage is the increased differentiation ability between different neutrons and radiation fragments.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DESCRIPTION OF THE PREFERRED EMBODIMENTS (BEST MODES FOR CARRYING OUT THE INVENTION)

The present invention encompasses neutron detectors utilizing sol-gel chemistry for placement of fissionable materials in conjunction with a detector for detecting neutron flux. Additionally, the invention provides use of an activation disk to increase sensitivity, efficiency, and accuracy of neutron detection.

Silicon surface barrier charged particle detectors (SBD) are available in industry that have been optimized for detecting alpha particles from radon and thoron for air monitoring in workplaces having potential unhealthy dose exposures. These rugged detectors are easily converted to neutron detectors by utilization of sol-gel technology, specifically by coating the detector surface with doped sol-gel glass.

Preferably, the sol-gel glass film utilized in the present invention contains a fissionable material such as lithium oxide, boron oxide, uranium oxide, thorium oxide, plutonium oxide, or neptunium oxide which, when bombarded with neutrons, emits a prompt electron, proton, triton, or fission fragment which is detectable by standard UV and particle detectors as discussed above, e.g. microchannel plate, channeltron, avalanche photodiode, scintillator, or silicon surface barrier detector. Most preferably, the sol-gel film contains Boron-10 and Lithium-6. B-10 yields an alpha particle and a Li-7 atom, while Li-6 yields a triton and an alpha particle. Both emissions are considered "prompt" emissions. A fission fragment or electron is prompt if the electron or fragment is emitted in less than 1 nanosecond of the neutron absorption.

Figure 1:
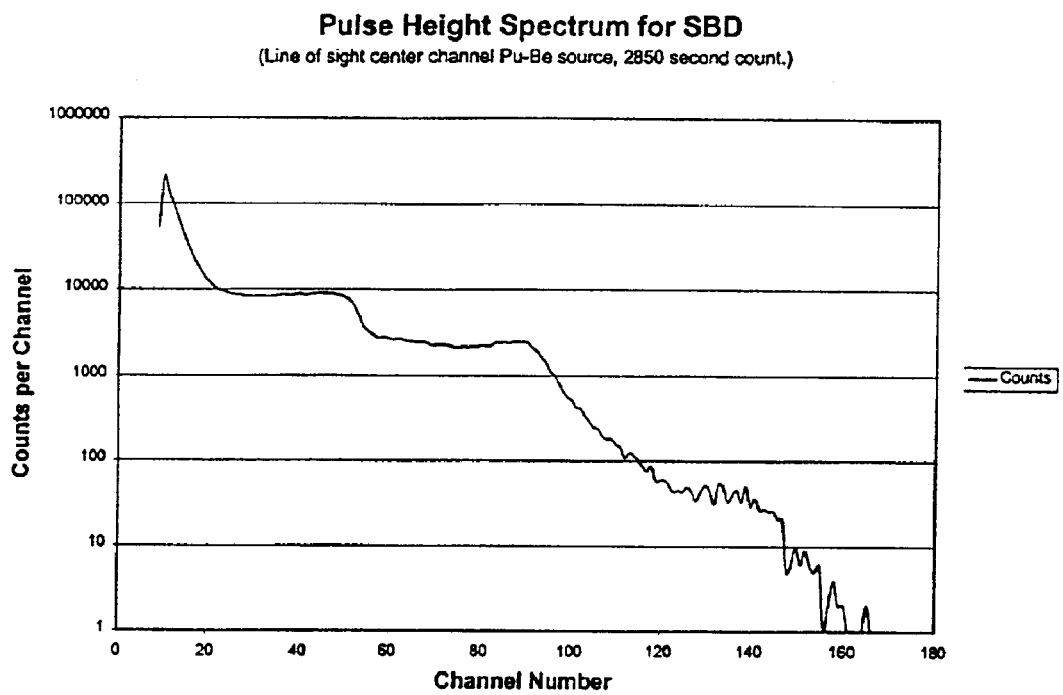
FIG. 1 is a graph of a pulse height spectrum for the sol-gel coated SBD neutron detection system of the present invention.

Use of a generic silicon surface barrier detector (SBD) that has been doped with Li and B atoms through use of sol-gel technology provides a sensitive neutron detector that is rugged and easily constructed, unlike prior art devices. Additionally, the presence of an activation disk, also referred to as a beta emitting foil, results in a sharp increase in the size of the low energy peak of a typical pulse height spectrum for the sol-gel coated SBD. Such a spectrum is shown in FIG. 1. Several important features are visible, including a sharp peak at the low energy end of the spectrum followed by two successive plateaus before the curve trails off. This spectrum is consistent with a basic shape made in the presence of neutrons.

Scintillation devices are well known in the art and contain phophorylating particles or crystals which emit light upon ionization. The present invention may include scintillators that scintillate upon exposure to radiation. Additionally, instead of utilization of microchannel plates or channeltrons, the present invention may utilize signal pulses produced from radiation fragments detected, amplify the signal, and then converts the signal to data utilizing modern devices including a pre-amp, amp, multi-channel analyzer and a computer.

The B-10 and Li-6 dopants are extremely useful in neutron detection. The Li-6 produces a triton and an alpha particle of combined energy 4.79 MeV, while the B-10 produces an alpha and a Li-7 atom with a Q value of 2.79 MeV (0.48 MeV is given off as a gamma ray). In cases where a significant fast flux is present, some reactions are produced by neutrons well above the thermal range, therefore, some reaction products have significant energy contributions from the kinetic energy of the neutron and are more energetic than the predicted Q values. In such cases, the angle between the directions of the two reaction products are significantly less than the expected 180 degrees. Most Li and B reactions with neutrons result in a reaction product entering the detector leaving an ionization trail of electrons.

The activation disk is preferably constructed of silver, and most preferably Ag-109 which activates to Ag-110 and decays with a 24.6 second half-life by beta particle emission at a maximum of 2.981 MeV. These beta particles, with an energy of around 11 MeV, pass through the sol-gel and into the SBD. As mentioned above, the presence of the disk results in a sharp increase in the size of the low energy peak, and the size of the two plateaus are also affected. The first plateau (less energy deposited) is depressed and the second (more energy deposited) plateau is slightly reinforced.

Figure 3:
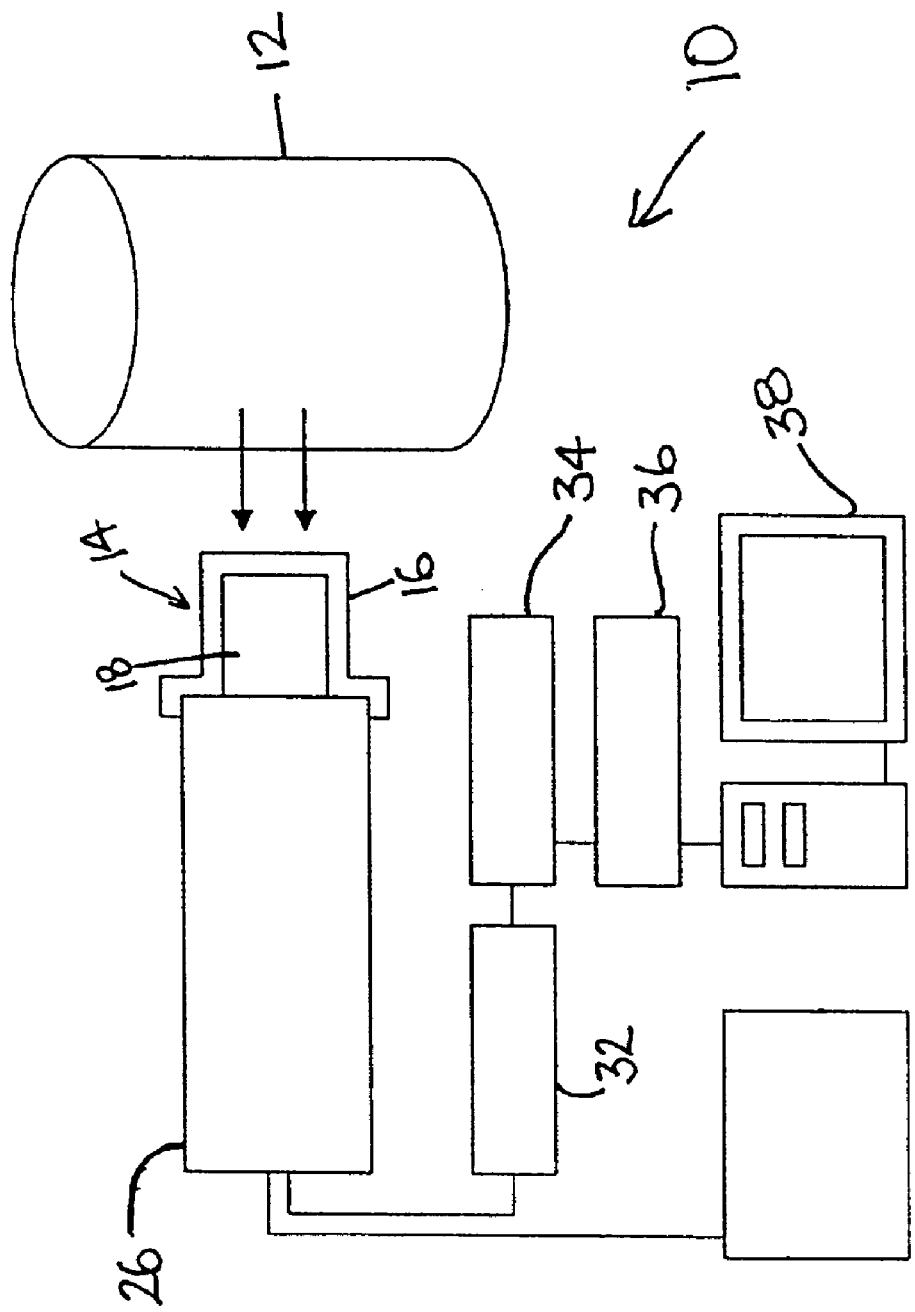
FIG. 3 is a diagram of one embodiment of the present invention depicting a sol-gel scintillator signal processing system utilizing a generic Pu—Be source.

As shown in FIG. 3 a sol-gel scintillator detector 10 includes generic Pu—Be source 12, placed in thermal contact with sol-gel glass receiver 14. Although the Invention shows a Pu-Be source, the invention is not limited to detection of these sources. Pu—Be is used for illustration purposes only as the source of commercial application is a spent nuclear fuel rod, stored plutonium in canisters or transuranic waste. Receiver 14 is a contained unit 16 formed from sol-gel glass 18 preferably doped with B and Li atoms for neutron sensitivity and may contain scintillator crystals/fluors for generating a light output for coupling to a photomultiplier. Receiver 14 utilizes unit 16, such as glass bottle 24. Receiver 14 Is coupled to photomultiplier tube (PMT) 26. which is used to produce electrical signal correlated to scintillation pulses 30 from receiver 14. Scintillation pulses result from neutron capture in lithium and boron atom dopants transferring ionization energy to organic fluors placed in the sol-gel. Signal emitted by PMT 26 is electrically conducted through pre-amp 32 and amp 34 in sequence, and is then conducted into multi-channel analyzer (MCA) 36. Data emitted from MCA 36 is processed by computer 38 to sort the pulses into channel spectrum.

Figure 4:
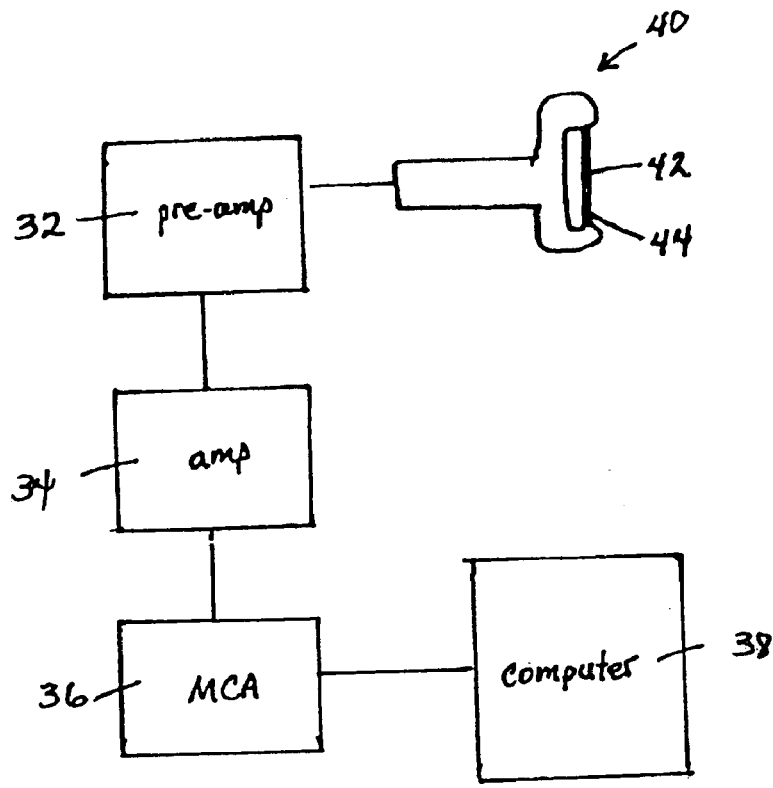
FIG. 4 is a diagram of one embodiment of the present invention depicting a generic silicon surface barrier detector system utilizing a sol-gel film.

FIG. 4 depicts generic silicon surface barrier/charged particle detector 40 utilizing sol-gel film 42 placed on detector surface 44. Sol-gel film 42 is preferably doped with B-10 and Li-6 atoms. Ideally, thickness of sol-gel film 42 should be no more than the range of the charged particles. As discussed above, most Li and B reactions with neutrons result in a reaction product 48 entering detector 40 and leaving ionization trail of electrons. Charge bias sweeps electrons 50 into pre-amp 32 and amp 34 in sequence, and is then conducted into multi-channel analyzer (MCA) 36. The data emitted from MCA 36 is processed by computer 38 to sort the pulses into channel spectrum.

Figure 5:
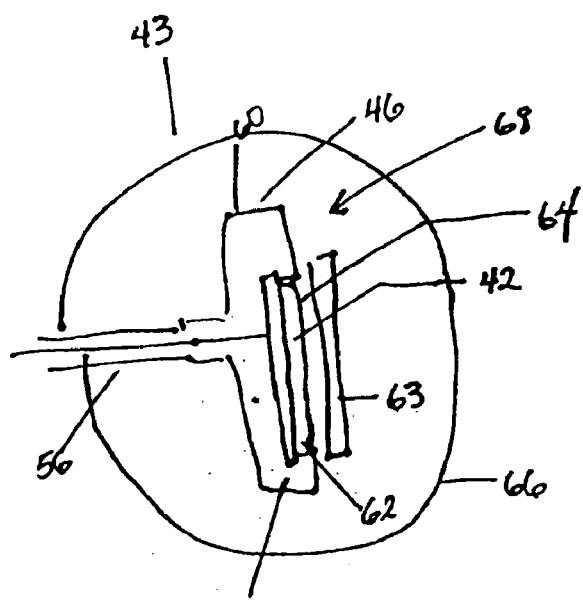
FIG. 5 is a magnified cut-away view depicting the detector end of the silicon surface barrier detector, illustrating the sol-gel film and the activation disk.

FIG. 5 depicts a close-up view of detector surface area 46 of generic silicon surface barrier detector 43 having connector 56 and housing 58. Housing 58 has opposing ends 60 disposed for receipt of commercially available silicon detection wafer 62. Sol-gel film 42 is preferably doped with B-10 and Li-6 atoms 20 and is deposited on surface area 44 of commercially available silicon detector wafer 62. Beta particle emitting foil 63 is placed over B-10 and Li-6 atom coated side 64 of wafer 62. Polyethylated moderator 66 surrounds detector head 68 for use as a Bonner Sphere.

INDUSTRIAL APPLICABILITY

The invention is further illustrated by the following non-limiting examples.

An experiment was conducted to determine the effect the activation disk would have on distinguishing thermal versus prompt emissions. This experiment is described in Example 1.

EXAMPLE 1

The SBD was attached to the silver disk and both were lowered down a side channel of a Pu—Be source drum. Sufficient time was allowed for the saturated activation intensity to be achieved. The SBD/disk system was then removed from the drum and placed on a table several feet away. A three hundred second count was made as the silver decayed. A second three hundred count was taken to insure decay.

Figure 2:
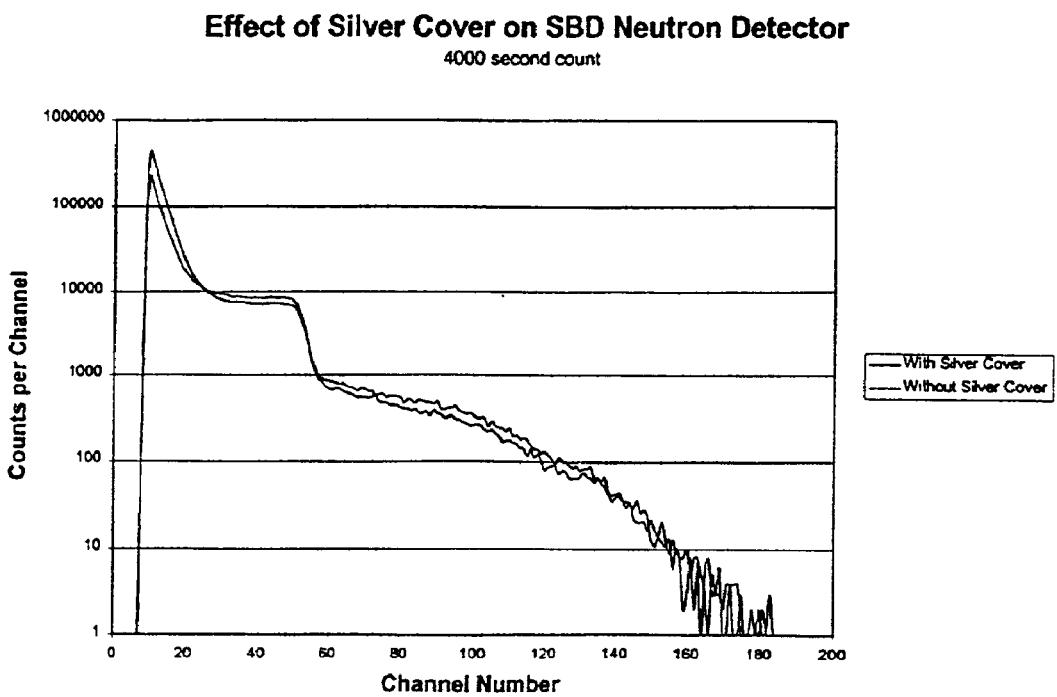
FIG. 2 is a graph depicting the counts per channel over the range of channels with and without the presence of a silver activation disk.

FIG. 2 shows the counts per channel over the range of channels with the presence of the silver disk and without it. The diagram shows an increased first peak and depressed first plateau in the presence of silver. The difference is attributable to the betas from the silver decay. The silver betas did not register any higher than in channel 40, corresponding to 2 MeV. For comparison, measurements taken of gamma rays from Co-60 and Cs-137 both exhibited a cut-off around channel 25, corresponding to 1.3 MeV. When counting in the gamma field, pulses from electrons registered in the SBD came primarily from gamma interaction in the air and in surrounding materials as opposed to the silicon layer.

Since beta and gamma pulses will not go beyond channel 40, any counts beyond this are from neutrons. Since the majority of SBD neutron counts occur beyond channel 40, including counts extending out to around channel 170, very reliable neutron-gamma separation is achieved, even in a 2.2 MeV capture gamma background. This was not possible with prior art devices.

As the SBD pulse spectrum in the presence of the silver disk (but not without it) showed a significant decrease in the height of the first plateau and no effect on the second plateau, this demonstrates that the presence of the silver affects neutrons that produce pulses in the first plateau and allows neutrons that produce pulses in the second plateau to pass through unaffected. It is believed that neutron absorption and activation by Ag-109 in the silver disk was responsible for the decrease in the neutron count rate in this first region. However, since the Ag-109 activation becomes inconsequential above several hundred eV, it is concluded that pulses in the first plateau were in large part coming from neutrons in the thermal range and that pulses in the second plateau were produced by neutrons above that energy level.

It is believed that an explanation of why the fast (or prompt) neutrons tend to produce higher amplitude pulses follows directly out of the kinematics of the collision reactions. Thermalized neutrons have a very low momentum in comparison to the momentum of the reaction products from lithium and boron. Thus, the reaction products travel at 180 degrees to each other. Only one reaction product is likely to enter the SBD and produce a pulse when the SBD is on one side of the sol-gel only. (Backscatter of the reaction product traveling away from the SBD back into the SBD is possible, but uncommon.) For a Q value from 4.79 MeV for Li-6, the alpha product has an energy of 2.05 MeV, and the triton has an energy of 2.74 MeV. This is required for conservation of momentum. The average of the two energies is about 2.4 MeV. This energy corresponds very closely to the first shoulder.

In the case where the neutron has substantial momentum (i.e. it has significant energy), the reaction products normally travel at a smaller angle relative to each other, besides showing significant enhancement in the forward direction. The result is that both reaction products often enter the SBD, resulting in much larger energy deposition in the SBD and hence a much larger pulse. The second shoulder was found to be at 4.7 MeV which corresponds very well to the 4.79 MeV Q value of the reaction.

Significant energy enhancement of the reaction products due to the addition of the kinetic energy from the neutron occurs for reactions for very high energy neutrons. This extra energy most affects the reaction product traveling most directly towards the SBD when the neutron is travelling perpendicularly to the SBD. The highest energy pulses were counted from the Pu—Be source splitting Li-6 atoms. Therefore, the first plateau corresponds to counts from single reaction products, primarily from thermal neutrons. The second plateau is produced by both reaction products entering the SBD, while the trail-off beyond it is produced by both reaction products with a highly augmented energy, both cases being produced by a fast neutron.

Therefore, the sol-gel dopants of the invention, utilizing Li-6 and B-10, when incorporated into the neutron detection apparatus of the present invention, provide a detector with a distinct spectrum for both identifying neutron pulses and further identifying prompt versus thermal neutron readings. Additionally, use of the activation disk of the invention further accommodates increased sensitivity for prompt neutrons and differentiation of neutron readings from other radiation particles.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of detecting neutrons comprising the steps of:
providing a neutron detector comprising a silicon surface barrier charged particle detector;
disposing a sol-gel medium on a detector surface of the silicon surface barrier charged particle detector;
incorporating a fissionable material into the sol-gel medium;
absorbing a neutron Into the fissionable material, yielding at least one fission product comprising a prompt emission;
disposing a beta particle-emitting activation material over, and parallel to, the detector surface so that the activation material responds to an additional neutron from a same radiation as does the fissionable material;
emitting a charged particle from the activation material capable of passing through the sol-gel medium to the detector surface to augment a detection, per unit of time, of a quantity of neutrons detected, per unit of time, through a detection of the prompt emission from the fissionable material;
detecting in real time the fission product and the charged particle; and
measuring an energy level exceeding any enemy level capable of being produced by a gamma radiation.

2. The method of claim 1 wherein the step of incorporating a fissionable material into the sol-gel medium comprises incorporating a material comprising at least one element selected from the group consisting of Li-6, B-10, U-234, U-235, U-236, U-238, Pu-238, Pu-239, Pu-240, Th-232, and Gd.

3. The method of claim 2 wherein the step of incorporating a fissionable material into the sol-gel medium comprises incorporating a material comprising at least one element selected from the group consisting of Li-6 and B-10.

4. The method of claim 1 wherein the step of incorporating a fissionable material into the sol-gel medium comprises incorporating a metallic ion.

5. The method of claim 4 further comprising the step of disposing the metallic ion within a metallic compound selected from the group of fissile metals consisting of lithium, boron, uranium, thorium, plutonium, and neptunium.

6. The method of claim 1 further comprising an additional step comprising detecting with a second detector, wherein the second detector is selected from the group consisting of a photomultiplier tube, a microchannel plate, a channeltron, an avalanche photodiode, a scintillator, and a silicon surface barrier charged particle detector.

7. The method of claim 1 wherein the step of providing an activation material comprises a silver activation material.

8. The method of claim 7 wherein the step of providing a silver activation material comprises providing Ag-109 activation material.

9. The method of claim 1 further comprising the step of providing a phosphor.

10. method of claim 1 further comprising the step of providing a crystal.

11. The method of claim 1 wherein the step of providing a neutron detector comprises providing a second detector and the incorporating step comprises incorporating the fissionable material in the sot-gel medium between the detectors.

12. The method of claim 1 further comprising the step of providing a phosphor and electrically connecting it to the detector.

13. The method of claim 12 further comprising the step of disposing a camera near the phosphor for recording neutrons striking the fissionable material in the sol-gel medium.

14. The method of claim 1 wherein the step of providing a detector comprises providing a plurality of detectors.

15. The method of claim 1 further comprising the additional steps of providing a neutron source pulsing the neutron source and detecting the prompt emission with the detector.

16. The method of claim 15 wherein the step of pulsing the neutron source comprises emitting neutrons from the neutron source through a test article towards the neutron detector.

17. The method of claim 1 further comprising the step of providing an x-ray source, emitting x-rays directed at a test article and generating photoneutrons from the test article for detection by the neutron detector.

18. The method of claim 1 wherein the step of yielding at least one fission product comprising a prompt emission comprises emitting at least one fission product selected from the group consisting of a prompt electron, proton, triton and alpha particle, and fission fragment.

* * * * *